United States Patent
Wu et al.

(10) Patent No.: US 8,140,501 B2
(45) Date of Patent: Mar. 20, 2012

(54) ATTRIBUTE PRESENTER OF OBJECT ATTRIBUTES AND METHOD FOR PRESENTING OBJECT ATTRIBUTES USING THE ATTRIBUTE PRESENTER

(75) Inventors: Song Wu, Ontario (CA); Peter Andrew Nicholls, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 506 days.

(21) Appl. No.: 11/946,547

(22) Filed: Nov. 28, 2007

(65) Prior Publication Data

US 2009/0138499 A1 May 28, 2009

(51) Int. Cl.
*G06F 17/30* (2006.01)

(52) U.S. Cl. .................. 707/705; 707/802; 707/956

(58) Field of Classification Search .................. 707/101, 707/999.101, 705, 802, 956
See application file for complete search history.

(56) References Cited

U.S. PATENT DOCUMENTS

| | | | |
|---|---|---|---|
| 5,438,659 A * | 8/1995 | Notess et al. ................. 715/202 |
| 5,850,206 A | 12/1998 | Kashiwagi |
| 5,864,865 A * | 1/1999 | Lakis ................................... 1/1 |
| 6,101,498 A | 8/2000 | Scaer |
| 6,282,175 B1 * | 8/2001 | Steele et al. ................. 370/254 |
| 6,543,046 B1 * | 4/2003 | Lunt ............................... 717/105 |
| 6,970,844 B1 * | 11/2005 | Bierenbaum ..................... 705/39 |
| 7,187,389 B2 * | 3/2007 | Redpath et al. ................ 345/619 |
| 7,257,594 B2 * | 8/2007 | Tamboli et al. ............... 707/101 |
| 7,363,309 B1 * | 4/2008 | Waite et al. ................... 707/101 |
| 7,555,488 B2 * | 6/2009 | Bernstein et al. ..................... 1/1 |
| 7,739,291 B2 * | 6/2010 | Broker ........................... 707/758 |
| 2002/0054169 A1 * | 5/2002 | Richardson ................... 345/854 |
| 2002/0152122 A1 * | 10/2002 | Chino et al. ..................... 705/14 |
| 2002/0184401 A1 * | 12/2002 | Kadel et al. ................... 709/315 |
| 2003/0105771 A1 * | 6/2003 | Tiefenbrun et al. ....... 707/103 R |
| 2003/0229627 A1 * | 12/2003 | Carlson et al. ..................... 707/3 |
| 2004/0252134 A1 * | 12/2004 | Bhatt et al. .................... 345/619 |
| 2005/0065972 A1 * | 3/2005 | Haines et al. ............. 707/103 R |
| 2005/0091655 A1 * | 4/2005 | Probert et al. ................. 718/100 |
| 2005/0197852 A1 * | 9/2005 | Gebhard et al. ................... 705/1 |
| 2005/0246663 A1 * | 11/2005 | Yeung et al. .................. 715/851 |
| 2006/0004848 A1 * | 1/2006 | Williams et al. .......... 707/103 R |
| 2006/0004917 A1 * | 1/2006 | Wang et al. ................... 709/223 |

(Continued)

OTHER PUBLICATIONS

"Research on the Management Mode of Information System Based on Dynamic Tree View", Journal of Zhejiang University of Technology, vol. 35, Feb. 2007 (English-Language Abstract).

*Primary Examiner* — Hung T Vy
*Assistant Examiner* — Phuong Thao Cao
(74) *Attorney, Agent, or Firm* — Novak Druce + Quigg LLP

(57) ABSTRACT

An attribute presenter of object attributes from at least one object includes an attribute controller for determining which attributes to select; an attribute collector for collecting and normalizing the determined attributes from the at least one object; an attribute organizer for organizing the collected and normalized attributes for display; and an attribute viewer for displaying the organized object attributes. A method for presenting object attributes using an attribute presenter includes the steps of determining which object attributes to select using an attribute controller; collecting and normalizing the determined object attributes from at least one object using an attribute collector; organizing the collected and normalized object attributes for display by an attribute organizer; and displaying the organized object attributes by an attribute viewer.

11 Claims, 2 Drawing Sheets

U.S. PATENT DOCUMENTS

| | | | |
|---|---|---|---|
| 2006/0014562 A1* | 1/2006 | Syrtsov et al. | 455/556.2 |
| 2006/0161856 A1* | 7/2006 | Heir | 715/769 |
| 2006/0168158 A1* | 7/2006 | Das | 709/220 |
| 2006/0212879 A1* | 9/2006 | Bennetto et al. | 719/328 |
| 2006/0218122 A1* | 9/2006 | Poston et al. | 707/1 |
| 2006/0248187 A1* | 11/2006 | Thorpe et al. | 709/224 |
| 2006/0265664 A1* | 11/2006 | Simons et al. | 715/772 |
| 2007/0016601 A1* | 1/2007 | Cameron et al. | 707/101 |
| 2007/0126746 A1* | 6/2007 | Lee | 345/530 |
| 2007/0162486 A1* | 7/2007 | Brueggemann et al. | 707/102 |
| 2007/0179934 A1* | 8/2007 | Basov et al. | 707/3 |
| 2007/0192055 A1* | 8/2007 | Tsujino et al. | 702/150 |
| 2007/0211056 A1 | 9/2007 | Chakraborty | |
| 2008/0065756 A1* | 3/2008 | Hardwick et al. | 709/224 |
| 2008/0133472 A1* | 6/2008 | Patterson | 707/3 |
| 2008/0183715 A1* | 7/2008 | Chen et al. | 707/10 |
| 2008/0270469 A1* | 10/2008 | Myerson et al. | 707/104.1 |
| 2008/0313120 A1* | 12/2008 | Kumbi et al. | 706/47 |
| 2009/0106732 A1* | 4/2009 | Hanson et al. | 717/104 |

* cited by examiner

ATTRIBUTE PRESENTER OF OBJECT ATTRIBUTES AND METHOD FOR PRESENTING OBJECT ATTRIBUTES USING THE ATTRIBUTE PRESENTER

FIELD OF THE INVENTION

The present invention relates to the field of data processing, and, more particularly, to handling data represented as an object.

BACKGROUND OF THE INVENTION

In the context of computing systems and devices, an object can be defined as a run-time unit that is capable of receiving messages, processing data, and exchanging other messages with other objects. Each object is considered to be an instantiation of a class. An object can have many attributes. However, a user might be interested only in a particular group of attributes at a given time. Accordingly, it can in some instances assist a user to be able to view only the attributes of interest. For instance, while an application program typically includes many variables and pointers, the user might only want to check a small set of them during a debugging session. The user also might want to control the manner in which the attributes are presented in the view, perhaps having the attributes presented as a node-and-branch tree, or a table, or even a group of icons. Of course, during different sessions, different attributes will be of interest to the user.

Usually an object creator who created the object is responsible for creating a view with which object attributes requested by a user can be presented. It is generally not easy, however, for the creator to handle all the various customizable presentation requests that may arise. A user can encounter problems such as having to make separate requests for different objects and being unable to control the presentation form. Even more fundamentally, there are no effective and efficient mechanisms for presenting at the same time attributes from different objects. Accordingly, there is a need for some type of attribute presenter that can easily handle customizable presentation requests for presenting attributes from one object or from multiple objects at the same time.

SUMMARY OF THE INVENTION

Accordingly, an object of the invention is to provide an attribute presenter for presenting attributes of objects in a manner that solves the aforementioned problems. It is another object of the invention to provide an attribute presenter that can handle the presentation requests of multiple or all presentable objects.

According to one aspect, the present invention provides an attribute presenter of object attributes from at least one object, which may include an attribute controller for determining which attributes to select; an attribute collector for collecting and normalizing the determined attributes from the at least one object; an attribute organizer for organizing the collected and normalized attributes for display; and an attribute viewer for displaying the organized object attributes.

The attribute collector may include at least one interpreter for collecting attributes from the same object or different objects. The attribute controller and organizer can be based on an XML file and thus is easily extendable. The attribute presenter can create multiple instances of views to present different attribute sets of the same object or the attributes of different objects. The attribute viewer can display information including attribute name, value and other information in a tree, a table, a group of icons, or other form.

According to another aspect, the present invention provides a method for presenting object attributes using an attribute presenter, which may include the steps of determining which object attributes to select by an attribute controller; collecting and normalizing the determined object attributes from at least one object using an attribute collector; organizing the collected and normalized object attributes for display by an attribute organizer; and displaying the organized object attributes by an attribute viewer.

The collected and normalized attributes may be put in an attribute pool. The attribute collector can notify the attribute organizer when the attributes in the attribute pool are ready to be organized and displayed. The attribute organizer, upon being notified that the attributes are ready, can build the attributes into a presentable structure such as a tree, a table, a group of icons, or other form and pass the structure to the attribute viewer to display.

According to a further aspect, the present invention provides a computer-readable storage medium on which computer-executable codes are stored. The computer-executable codes, when loaded, can cause the computer to perform the steps of determining which object attributes to select using an attribute controller; collecting and normalizing the determined object attributes from at least one object using an attribute collector; organizing the collected and normalized object attributes for display by an attribute organizer; and displaying the organized object attributes by an attribute viewer.

BRIEF DESCRIPTION OF THE DRAWINGS

There are shown in the drawings, embodiments which are presently preferred. It is expressly noted, however, that the invention is not limited to the precise arrangements and instrumentalities shown.

DETAILED DESCRIPTION OF THE INVENTION

An attribute presenter of object attributes according to the present invention is a view which presents the presentable attributes of an object or multiple objects in a customized way. It collects the attributes from any object and presents the attributes in a user defined layout. It saves the object creator the effort to handle the presentation and provides the user an easy way to control the presentation of the object attributes. Since this solution is based on an XML file, it leaves a great space for the user to extend it.

The concept of the present invention will now be explained in more detail with the help of the illustration in FIG. 1, which show an example of an attribute presenter according to the present invention.

Figure 1:
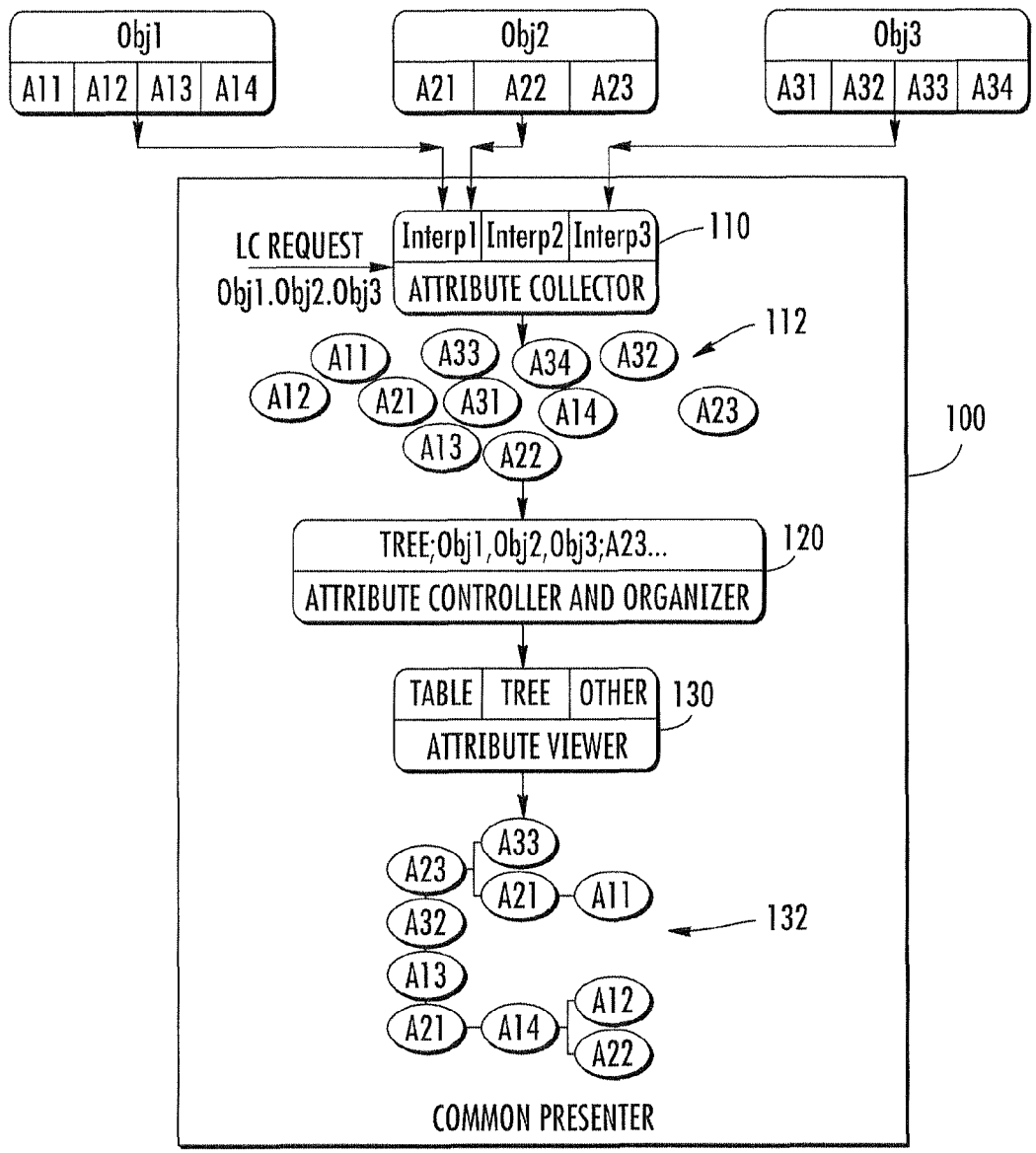
FIG. 1 is a diagram showing an example of a attribute presenter according to the present invention.

The attribute presenter 100 of object attributes as shown in FIG. 1 contains three major parts, an attribute collector 110, an attribute controller and organizer 120, and an attribute viewer 130. The attribute collector 110 collects presentable attributes from an object or multiple objects based on the determination of the attribute controller and organizer 120. It is the input channel of the attribute presenter 100 of object attributes. It normalizes the collected object attributes so that they can be handled properly by the attribute controller and organizer 120. It contains interpreters such as Interp1, Interp2, Interp3 for different objects. Each interpreter collects attributes from the same object or different objects. The attribute collector 110 also allows object creators to contribute interpreters for their own objects later. In other words, the number of interpreters can be expanded as needed.

The attribute controller and organizer 120 is based on an XML file in order to be expandable by the user. It contains the information on how to present the object attributes. More specifically, it determines which attributes to select and organizes the collected attributes for display. The attribute controller and organizer 120 can be easily updated by a user using an XML editor. Although the attribute controller and organizer 120 is shown in FIG. 1 as one component, it can be formed by two separate components including an attribute controller for determining which attributes to select and an attribute organizer for organizing the attributes for display.

The attribute viewer 130 displays the object attributes as determined and organized by the attribute controller and organizer 120. It has a predefined view. The user can create multiple instances of the view to watch different attribute sets of the same object or attributes of different objects.

As shown in the example of FIG. 1, the attribute controller and organizer 120 is defined to create an attribute tree with the attributes from the objects Obj1, Obj2 and Obj3. When the attribute presenter 100 of object attributes is opened by the user, the attribute controller and organizer 120 starts to see what objects it needs to construct the view and sends a request to the attribute collector 110 to collect attributes from Obj1, Obj2 and Obj3. For example, the attribute collector 110 use its interpreter Interp1 to collect the attributes A11, A12, ... from Obj1 and A21 ... from Obj2. Interp3 is used to collect the attributes A31, A32 ... from Obj3. The attribute collector 110 also normalizes the attributes for easy handling. The collected and normalized attributes are put in an attribute pool 112. When the attribute controller and organizer 120 is notified that the attributes in the attribute pool 112 are ready to be processed, it builds the attributes into a tree structure and passes the attribute tree to the attribute viewer 130. The attribute viewer 130 then presents the attribute name, value and other information in an attribute tree 132 to the user.

During a debug session, the user needs to access the memory for variables and pointers and some other information. Since there are so many of them in an application, the user wants to change the content of the view to show only the part of interest. Also, a user may want to be able to observe object attributes from different objects at the same time in one single view. The attribute presenter of object attributes according to the inventive concept of the invention can satisfy the above user requirements. In the example as described above, three interpreters have been created to handle memory information and other information. The current available attribute viewer displays the attributes in a table and a tree. The user can easily customize the attribute controller and organizer by changing the XML file without any coding effort. The current implementation is based on Eclipse. However, the concept of the present invention can also be implemented in any other programming language.

An example of a method for presenting object attributes using the attribute presenter 100 according to the present invention will now be explained in the context of the flow chart of FIG. 2.

Figure 2:
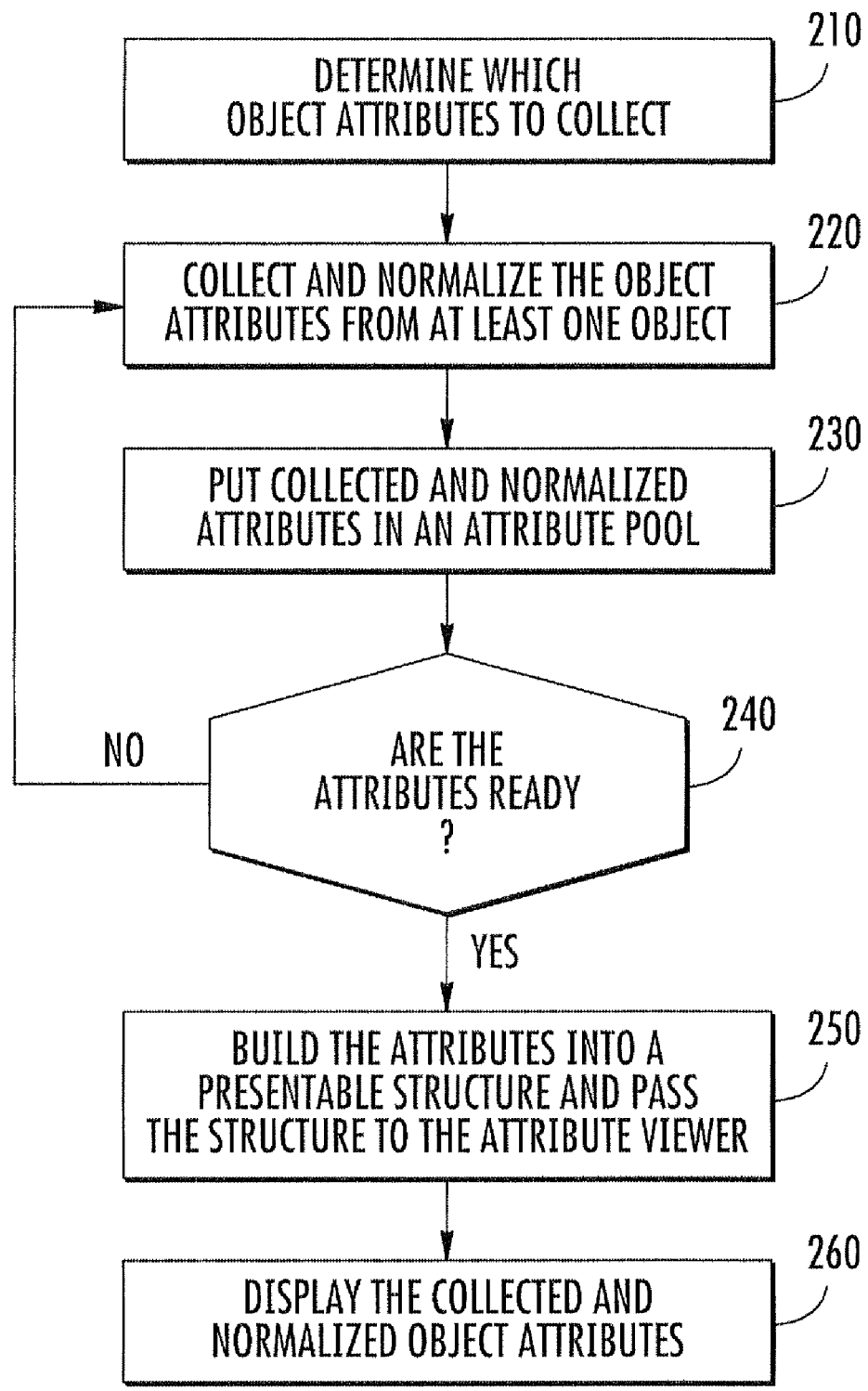
FIG. 2 is a flow chart showing a method for presenting object attributes using the attribute presenter according to the present invention.

As shown in FIG. 2, at step 210, the attribute controller and organizer 120 determines which object attributes to select and sends a request to the attribute collector 110. At step 220, the attribute collector 110 collects and normalizes the object attributes from at least one object. At step 230, the collected and normalized attributes are put in an attribute pool 112. At step 240, it is determined whether or not the attributes are ready. The attribute collector 110 notifies the attribute controller and organizer 120 if the attributes are ready. If the attributes are not ready, the attribute collector 110 continues collecting and normalizing object attributes and puts them in the attribute pool 112. At step 250, the attribute controller and organizer 120, upon being notified that the attributes are ready, builds the attributes into a presentable structure and passes the structure to the attribute viewer 130. At step 260, the attribute viewer 130 displays the collected and normalized object attributes in a predefined view.

The invention can be realized in hardware, software, or a combination of hardware and software. The invention can be realized in a centralized fashion in one computer system or in a distributed fashion where different elements are spread across several interconnected computer systems. Any kind of computer system or other apparatus adapted for carrying out the methods described herein is suited. A typical combination of hardware and software can be a general purpose computer system with a computer program that, when being loaded and executed, controls the computer system such that it carries out the methods described herein.

The invention can be implemented with computer-readable code embedded in a computer program product such as a computer-readable storage medium, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

The foregoing descriptions of preferred embodiments of the invention have been presented for the purposes of illustration. The description is not intended to limit the invention to the precise forms disclosed. Indeed, modifications and variations will be readily apparent from the foregoing description. Accordingly, it is intended that the scope of the invention not be limited by the detailed description provided herein.

We claim:

1. A computer-implemented system for presenting object attributes from a plurality of objects, comprising:
   at least one processor, at least one memory, and a display;
   an attribute controller for determining which attributes to select from the plurality of objects, each of the plurality of objects being a run-time unit that is configured for receiving messages, processing data, and exchanging other messages with other objects, each of the plurality of objects being an instantiation of a class;
   an attribute collector for collecting and normalizing determined attributes from the plurality of objects upon a request sent from the attribute controller to yield collected and normalized attributes, wherein the attribute collector includes one or more interpreters for collecting attributes from a same object or different objects, wherein a number of the interpreters is expanded as needed, and wherein the collected and normalized attributes are put in an attribute pool;
   an attribute organizer for organizing the collected and normalized into a presentation structure for display upon being notified by the attribute collector that the attributes in the attribute pool are ready to be processed, the presentation structure comprising a tree structure of the collected and normalized attributes; and an attribute viewer for displaying the presentation structure in a user-specified form on the display;

wherein the attribute controller and the attribute organizer are based on a configuration file using a markup language and updated by a user using an editor, the configuration file specifying a custom arrangement of the collected and normalized attributes within the tree structure.

2. The system of claim 1, wherein the configuration file is an XML file and the editor is an XML editor.

3. The system of claim 1, wherein the system creates multiple instances of views to present different attribute sets of the same object or the attributes of the different objects.

4. The system of claim 1, wherein the attribute viewer displays information including attribute name, value and other information in at least an attribute tree form.

5. A computer-implemented method for presenting object attributes from a plurality of objects, comprising:

determining which object attributes to select from the plurality of objects using an attribute controller, each of the plurality of objects being a run-time unit that is configured for receiving messages, processing data, and exchanging other messages with other objects, each of the plurality of objects being an instantiation of a class;

collecting and normalizing the determined object attributes from the plurality of objects using an attribute collector upon a request sent from the attribute controller to yield collected and normalized attributes, wherein the attribute collector includes one or more interpreters for collecting attributes from a same object or different objects, wherein a number of the interpreters is expanded as needed, and wherein the collected and normalized attributes are put in an attribute pool;

organizing the collected and normalized object attributes into a presentation structure for display by an attribute organizer upon being notified by the attribute collector that the attributes in the attribute pool are ready to be processed, the presentation structure comprising a tree structure of the collected and normalized attributes; and displaying the presentation structure by an attribute viewer in a user-specified form on a display;

wherein the attribute controller and the attribute organizer are based on a configuration file using a markup language and updated by a user using an editor, the configuration file specifying a custom arrangement of the collected and normalized attributes within the tree structure.

6. The method according to claim 5, wherein the configuration file is an XML file and the editor is an XML editor.

7. The method according to claim 5, further comprising:
creating multiple instances of views to present different attribute sets of the same object or the attributes of the different objects.

8. The method according to claim 5, wherein the attribute viewer displays information including attribute name, value and other information in at least an attribute tree form.

9. A computer-readable storage medium on which computer-executable codes are stored in a program, wherein the computer-executable codes, when loaded, cause a computer to perform:

determining which object attributes to select from a plurality of objects using an attribute controller, each of the plurality of objects being a run-time unit that is configured for receiving messages, processing data, and exchanging other messages with other objects, each object being an instantiation of a class;

collecting and normalizing the determined object attributes from the plurality of objects using an attribute collector upon a request sent from the attribute controller to yield collected and normalized attributes, wherein the attribute collector includes one or more interpreters for collecting attributes from a same object or different objects, wherein a number of the interpreters is expanded as needed, and wherein the collected and normalized attributes are put in an attribute pool;

organizing the collected and normalized attributes into a presentation structure for display by an attribute organizer upon being notified by the attribute collector that the attributes in the attribute pool are ready to be processed, the presentation structure comprising a tree structure of the collected and normalized attributes; and displaying the presentation structure by an attribute viewer in a user-specified form on a display;

wherein the attribute controller and the attribute organizer are based on a configuration file using a markup language and updated by a user using an editor, the configuration file specifying a custom arrangement of the collected and normalized attributes within the tree structure.

10. The computer-readable storage medium according to claim 9, wherein the program further causes the computer to perform:
creating multiple instances of views to present different attribute sets of the same object or the attributes of the different objects.

11. The computer-readable storage medium according to claim 9, wherein the program further causes the computer to perform:
displaying information including attribute name, value and other information in at least an attribute tree form by the attribute viewer.

* * * * *